United States Patent
Hobson et al.

(10) Patent No.: US 10,579,359 B2
(45) Date of Patent: Mar. 3, 2020

(54) COOLING FAN SPEED IN ACCORDANCE WITH A FIRMWARE UPDATE

(71) Applicant: Hewlett Packard Enterprise Development LP, Houston, TX (US)

(72) Inventors: Louis Hobson, Houston, TX (US); Hakeem Mohamed, Houston, TX (US); Mark Colbert, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/154,872

(22) Filed: May 13, 2016

(65) Prior Publication Data
US 2017/0329598 A1   Nov. 16, 2017

(51) Int. Cl.
*G06F 9/44* (2018.01)
*G06F 8/65* (2018.01)

(52) U.S. Cl.
CPC ...................... *G06F 8/65* (2013.01)

(58) Field of Classification Search
CPC .................................................. G06F 8/65
USPC ............................................... 717/168
See application file for complete search history.

(56) References Cited

U.S. PATENT DOCUMENTS

| | | | |
|---|---|---|---|
| 8,212,501 B2* | 7/2012 | Artman | F04D 27/004 318/454 |
| 2003/0217257 A1* | 11/2003 | Ebsen | G06F 8/67 713/100 |
| 2007/0140030 A1* | 6/2007 | Wyatt | G11C 5/00 365/212 |
| 2013/0031538 A1* | 1/2013 | Skalsky | G06F 8/654 717/168 |
| 2015/0198957 A1* | 7/2015 | Montero | G06F 1/206 700/300 |

OTHER PUBLICATIONS

Narayanan et al., "Whole-System Persistence", Mar. 2012, pp. 1-10.*

* cited by examiner

*Primary Examiner* — Wei Y Zhen
*Assistant Examiner* — Lanny N Ung
(74) *Attorney, Agent, or Firm* — Hewlett Packard Enterprise Patent Department

(57) ABSTRACT

Various examples herein disclose setting a cooling fan to an update operating speed that is higher than a normal operating speed in response to an indication that a firmware update is being executed. Such examples also disclose setting the cooling fan to a dynamic operating speed, which is adjusted in accordance with the firmware update, in response to an indication that the firmware update has completed.

12 Claims, 5 Drawing Sheets

COOLING FAN SPEED IN ACCORDANCE WITH A FIRMWARE UPDATE

BACKGROUND

In a computing system, firmware includes executable instructions to provide various functionality, such as communication, monitoring, and data manipulation of the computing system. Firmware may be programmed onto hardware components, such memory components, within a computing system to provide such functionality.

BRIEF DESCRIPTION OF THE DRAWINGS

In the accompanying drawings, like numerals refer to like components or blocks. The following detailed description references the drawings, wherein.

DETAILED DESCRIPTION

On occasion, a manufacturer may modify the firmware to improve the functionality. The improvement to the functionality may be released as firmware updates. However, when the firmware is updated at a memory component, thermal control capability may be compromised. For example during the occurrence of the firmware update, a processor may not be able to access the memory component for thermal monitoring. The inability to access the memory components may be due to a bus, such as a system management bus (SMBus) being dedicated to the firmware update. Additionally if multiple components in the system are in communication on the bus, this may cause data collisions during the firmware update. As such, compromising the thermal control capability may lead to overheating and/or failure within a system.

The present disclosure provides an efficient mechanism to compensate, during a firmware update, for the compromised thermal control capability. In response to a first indication that the firmware update is being executed, the disclosure sets a cooling fan to an updated operating speed. The updated operating speed is an increase in speed from the normal operating speed of the cooling fan. In response to a second indication that the firmware update is complete, the disclosure proceeds to set the cooling fan to a dynamic operating speed that is adjusted in accordance with the firmware update. Adjusting the operating speed of the cooling fan protects the system by cooling the hardware.

Additionally, the disclosure may provide another implementation to suspend communications on a bus in response to the execution of the firmware update. Communications may be resumed on the bus in response to the completion of the firmware update. Suspending communications on the bus provides an efficient mechanism which enables dedication of the bus to the firmware update.

The following detailed description refers to the accompanied figures. Wherever possible, the same reference numbers are used in the figures and the following description to refer to the same or similar parts. It is to be expressly understood, however, that the figures are for the purpose of illustration and description only. While several examples are described throughout, modification, adoptions, and other implementations are possible. Accordingly, the following detailed description is not meant to limit the disclosed examples, rather it is meant to provide proper scope of the disclosed examples and may be defined by the appended claims.

Figure 1:
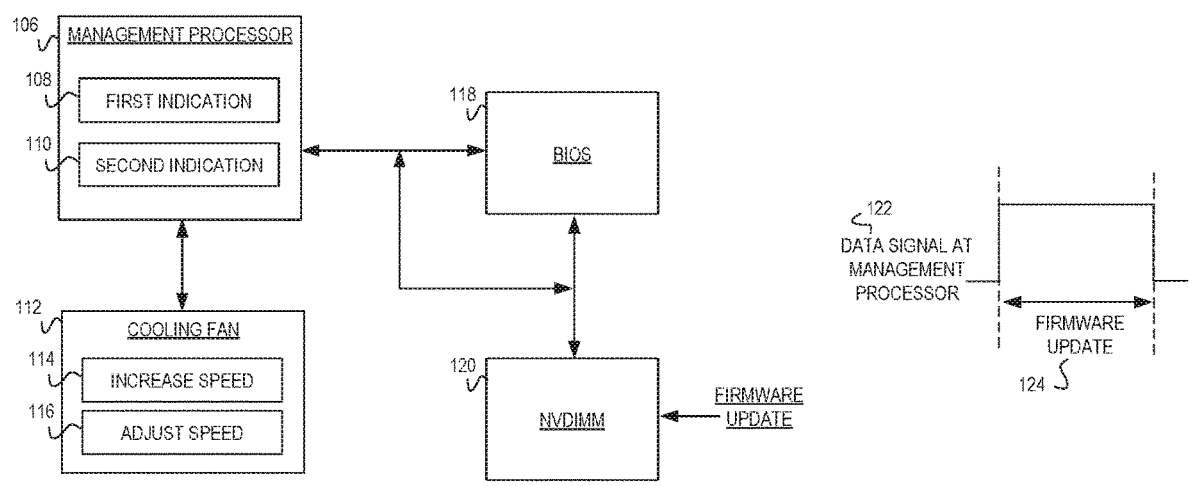
FIG. 1A illustrates an example system including a management processor to adjust a cooling fan speed based on a firmware update in accordance with the present disclosure.
FIG. 1B illustrates an example data signal asserted at a management processor based on execution and completion of a firmware update.

FIG. 1A illustrates an example system including management processor 106 to adjust a speed of cooling fan 112 in accordance with a firmware update. Management processor receives first indication 108 that firmware update is being executed at non-volatile dual in-line memory module (NVDIMM) 120. In response to first indication 108, management processor 106 sets an updated speed to cooling fan 112 which is increased from a normal operating speed at module 114. Management processor 106 may receive second indication 110 that the firmware update is complete at NVDIMM 120. In turn, management processor 106 may proceed to adjust speed of cooling fan 112 at module 116 by returning the cooling fan speed to the normal operating speed. These indications 108 and 110 may be transmitted by a processing component executing BIOS 118. FIG. 1A illustrates a computing system which includes components to provide the functionalities of the computing system. As such implementations of the computing system include, by way of example, a server, networking device, mobile system, computer, electronic system, or other type of computing system capable of executing firmware updates and adjust cooling fan 112 speed.

A bus, located between management processor 106 and NVDIMM 120 may be used for management processor 106 to measure thermals at NVDIMM 120. However, during the firmware update, this bus may be unavailable for management processor 106 to measure the thermals. As such, by adjusting the speeds of cooling fan 112 in accordance with the firmware update, management processor 106 can prevent a thermal failure during process of the firmware update. In other implementations in response to the execution of the firmware update, management processor 106 may suspend communications on the bus for the duration of the firmware update. In response to completion of the firmware update, management processor 106 may resume communications to NVDIMM 120 and other components. Implementations of the bus include a system management bus (SMBus), serial bus, universal serial bus (USB), fieldbus, controller area network (CAN Bus), RS-232, RS-485, etc.

Management processor 106 receives indications 108 and 110 and in turn adjusts the cooling fan speed at modules 114-116. Management processor 106 control and monitor the components in the system. In an implementation, management processor 106 may provide management from a remote location. This allows update, monitoring, and operating the system from remote locations.

First indication 108 represents a state of firmware update at a memory component, such as NVDIMM 120. Specifically, first indication 108 represents the execution of firmware update at NVDIMM 120. In one implementations, first indication 108 may be communicated from BIOS 118 as a flag representing the execution of firmware update 124. First indication 108 provides direction to management processor 106 signaling to set an increased speed of cooling fan 112 at module 114.

Second indication 110 represents a completion state of the firmware update at NVDIMM 120. Specifically, second indication 110 represents to management processor 106 that firmware update is close to completion or has already been completed. As such, second indication 110 may include a period of timeout from management processor 106. In this implementation, upon receiving first indication 108, management processor 106 may begin tracking the time for a timeout indicating the completion of firmware update. In another implementation, BIOS 118 may transmit a signal to management processor 106 serving as the second indication the firmware update is complete.

Cooling fan 112 is a fan within the system used for active cooling. As such, cooling fan 112 may draw cooler air into the system and move the cooler air across the components within the system to cool the components. The speed of cooling fan 112 is the rate at which the cool air is pushed across the components in the system. The speed of cooling fan 112 may be adjusted in accordance with the firmware update. For example, based on initiation of firmware update, the speed of cooling fan 112 may increase from the normal operating speed for the duration of the execution of the firmware update. Upon completion of the firmware update, the cooling fan 112 speed may adjust back to the normal operating speed.

At modules 114-116, management processor 106 sets the speed of cooling fan 112 based on the execution and completion of the firmware update. At module 114, management processor 106 sets the cooling fan 112 to increase speed from the normal operating speed, in this implementation, management processor 106 updates the operating speed of cooling fan 112 higher than the normal operating speed. Modules 114-116 may include, by way of example, instructions (e.g., stored on a machine-readable medium) that, when executed (e.g., by management processor 106 and/or cooling fan 112), implements the functionality of modules 114-116. Alternatively, or in addition, modules 114-116 may include electronic circuitry (i.e., hardware) that implements the functionality of modules 114-116.

BIOS 118 may include a basic input/output system executable by a processor different from management processor 106. BIOS 118 may communicate with NVDIMM 120 to track the states of the firmware update. As such, BIOS 118 uses this information to communicate with management processor 106 to set the speeds of cooling fan 112. BIOS 118 may include a system BIOS, computer BIOS, read-only memory (ROM) BIOS, etc.

NVDIMM 120 represents a memory component capable of retaining data when electrical power may be removed or loss from the system. As such, data retained by NVDIMM 120 may include firmware which may be added at the time of manufacturing NVDIMM 120. The firmware may be responsible to run user programs within the system. As such, this firmware may go through updates as by the manufacturer. In this implementation, a user of the system may select to check for the firmware update upon a network connection. Thus, the firmware update may be transmitted to the system for updating at NVDIMM 120. Although FIG. 1A illustrates the memory component going through the firmware update as NVDIMM 120, implementations should not be limited. For example, the memory component going through the firmware update may include a dual in-line memory module (DIMM), single in-line memory module, dynamic random-access memory, etc.

FIG. 1B illustrates an example data signal 122 as asserted at management processor 106 from BIOS 118. The rising edge of data signal 122 illustrates the assertion indicating to management processor 106 that firmware update is being executed. In this example, the rising edge may serve as first indication 108 for management processor 106 to set cooling fan 112 to increase speed at module 114. The data signal 122 remains active during the period of firmware update 124. The falling edge of data signal 122 represents the change of data signal to an inactive state. In this example, the falling edge may represent completion of firmware update at NVDIMM 120. As such, data signal 122 falling edge may serve as second indication 110 at management processor 106. The falling edge may be based on a timeout period by management processor 106 or by a signal from BIOS 118 communicating completion of firmware update. Although FIG. 1B illustrates the speed of the fan increasing at the rising edge of data signal 122, this was done for illustrates purposes and not for limiting implementations. For example, if data signal 122 remains high, upon the falling edge, this indicates to management processor 106 to set the cooling fan 112 to increase.

Figure 2:
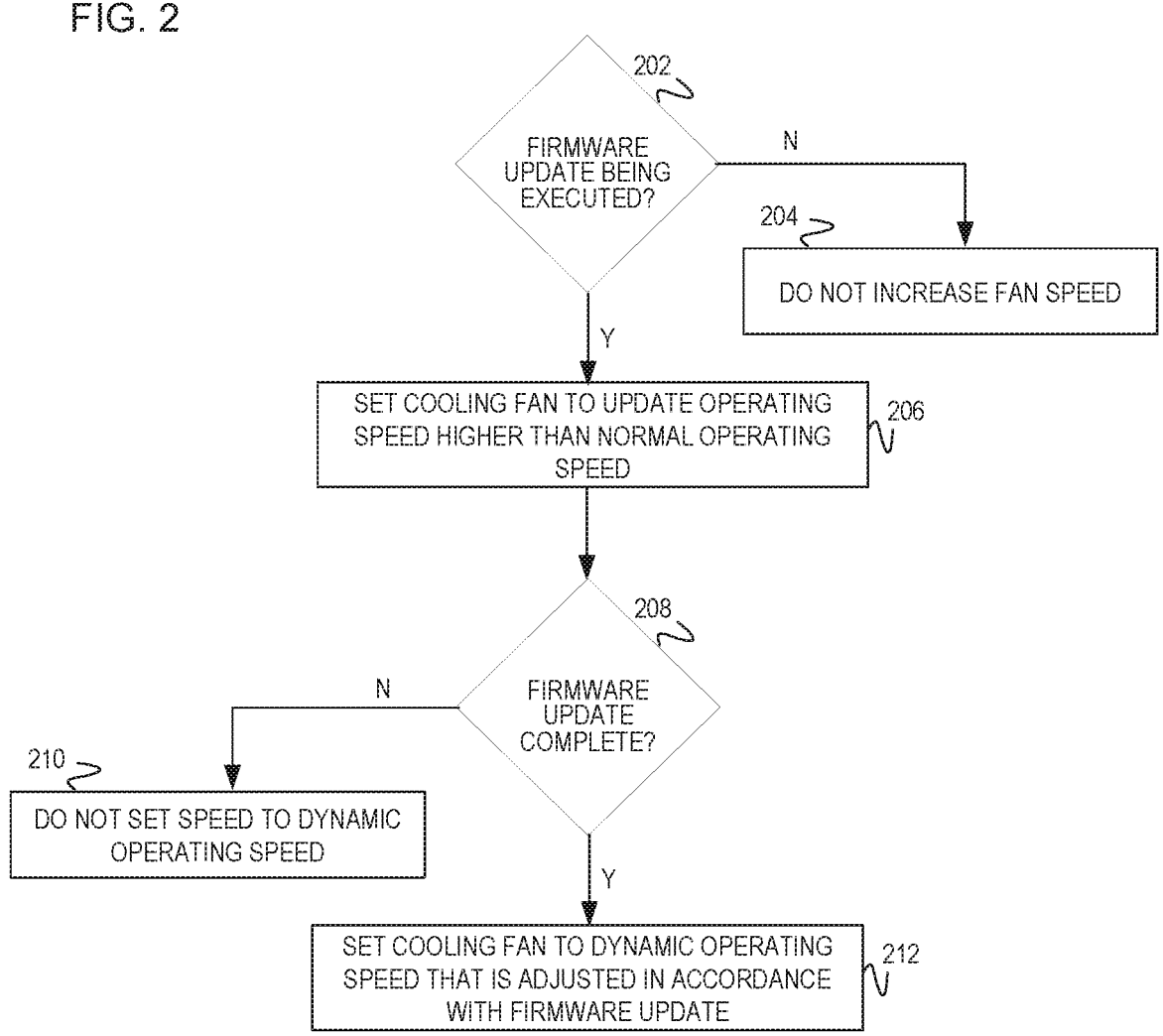
FIG. 2 is a flowchart of an example method to set a cooling fan speed based on a firmware update in accordance with the present disclosure.
Figure 3:
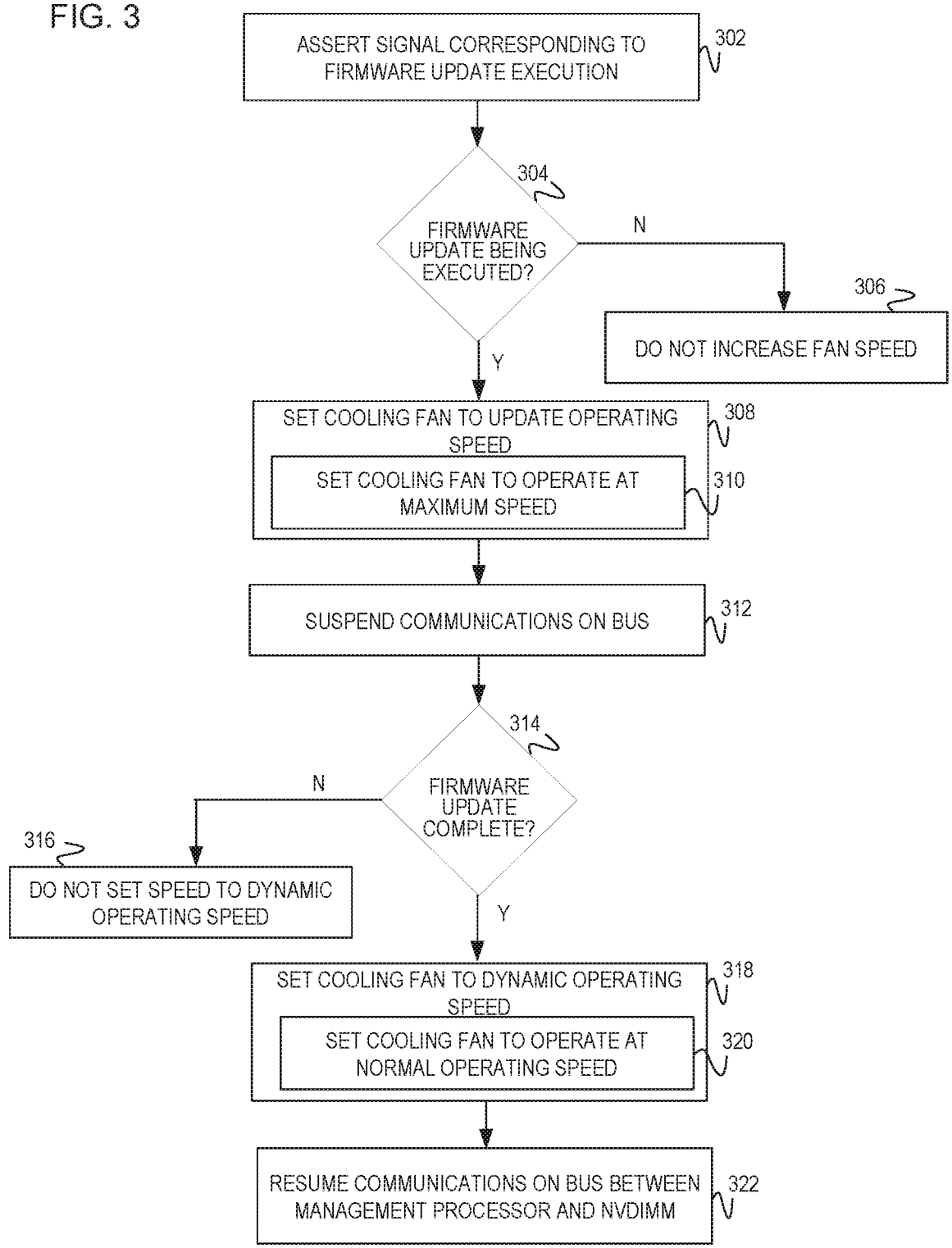
FIG. 3 is a flowchart of an example method to adjust a cooling fan speed by setting a cooling fan speed to a maximum speed in response to an execute of firmware update and setting the cooling fan to a decreased speed in response to completion of the firmware update in accordance with the present disclosure.

Referring now to FIGS. 2-3, example flowcharts are illustrated in accordance with various examples of the present disclosure. The flowcharts represent processes that may be utilized in conjunction with various systems and devices as discussed with reference to the preceding figures. While illustrated in a particular order, the flowcharts are not intended to be so limited. Rather, it is expressly contemplated that various processes may occur in different orders and/or simultaneously with other processes than those illustrated.

FIG. 2 is a flowchart of an example method to set a cooling fan speed in accordance with a firmware update. The method is executable by a management processor to set the cooling fan speeds, accordingly. The management processor may receive a first indication that the firmware update is being executed. Based on whether the first indication is received, the management processor may proceed to set the cooling fan speed to higher than a normal operating speed or set the cooling fan speed to remain (i.e., do not increase fan speed). The management processor may proceed to receive a second indication that the firmware update has completed. Based on whether the second indication is received, the management processor may proceed to set the cooling fan speed to resume the normal operating speed or may not set the speed. In discussing FIG. 2, references may be made to the components in FIGS. 1-1A to provide contextual examples. In one implementation, management processor 106 as in FIG. 1 executes operations 202-212 to adjust the cooling fan speed in accordance with the firmware update. Further, although FIG. 2 is described as implemented by the management processor, it may be executed on other suitable components. For example, FIG. 2 may be implemented in the form of executable instructions on a machine-readable storage medium 404 and 504 as in FIGS. 4-5. In other implementations, the illustrated flowchart may be executed by a computing device.

At operation 202, the management processor may receive the first indication that the firmware update is being executed at a component. In response to receipt of this first indication, the management processor may proceed to set the cooling fan speed to higher than the normal operating speed. In this implementation, the cooling fan speed may increase above the normal operating speed. If the management processor does not receive the first indication that the firmware update is being executed, this non-receipt may indicate the firmware is not being updated at the present time. In response to the non-receipt, the management processor does not increase the cooling fan speed from the normal operating speed. In one implementation, a signal is asserted at the management processor to indicate the execution of the firmware update. In this implementation, a different processor executing a BIOS program may transmit a signal raising a flag to the management processor. This flag indicates the execution of the firmware update to the management processor. Based on the execution of the firmware update, the management processor may proceed to increase the cooling fan speed.

At operation 204 based on the non-receipt of the first indication, the management processor does not increase the cooling fan speed. The non-receipt may indicate there are no firmware updates at a given time.

At operation 206 in response to the first indicator of execution of the firmware update, the management processor sets the cooling fan to the updated operating speed. The updated operating speed is a speed that is higher than the normal operating speed. In one implementation, the updated operating speed may be a maximum operating speed of the cooling fan. The cooling fan may transmit a signal to the cooling fan to set the updated operating speed. The signal indicates to the cooling fan to increase speed from the normal operating speed.

At operation 208 the management processor may receive a second indication that the firmware update is complete. In this implementation, the cooling fan may be operating at the increased speed during the execution of the firmware update. As such, the management processor may receive another signal which is asserted at the management processor indicating the completion of the firmware update. In another implementation, the execution of the firmware update may be timed out. These implementation indicate to the management processor to set the cooling fan speed to the dynamic operating speed. If the management processor does not receive the second indication, this may indicate the firmware update is still on-going.

At operation 210 based on the management processor not receiving the second indication that the firmware update is complete, the cooling fan speed is not adjusted. In this implementation, the firmware update may still be executing at the memory component. As such, the cooling fan speed may already be operating at the increased speed.

At operation 212 in response to the receipt of the second indication that the firmware update is complete, the management processor sets to the cooling fan to the dynamic operating speed. The dynamic operating speed is adjusted in accordance with the firmware update. This means the increased cooling fan speed may be reduced based on completion of the firmware update. In an implementation based on completion of the firmware update, the management processor may resume communications on a bus to those components which may have undergone the firmware update.

FIG. 3 is a flowchart of an example method to adjust a cooling fan speed in response to firmware updates. The method is executable by a management processor to adjust the cooling fan speed, accordingly. The management processor asserts a signal corresponding to execution of the firmware update. The signal serves as a first indication that the firmware update is being executed at the NVDIMM. Upon receiving the first indication, the management processor may proceed to set the cooling fan speed to operate at a maximum speed and suspend communications on a bus. The management processor may proceed to receive a second indication that upon completion of the firmware update. In response to receipt of the second indication, the management processor proceeds to set the cool fan speed to resume operation at the normal operating speed and to resume communication on the bus. In discussing FIG. 3, references may be made to the components in FIGS. 1-1A to provide contextual examples. In one implementation, management processor 106 as in FIG. 1 executes operations 302-322 to adjust the cooling fan speed in accordance with the firmware update. Further, although FIG. 3 is described as implemented by the management processor, it may be executed on other suitable components. For example, FIG. 3 may be implemented in the form of executable instructions on a machine-readable storage medium 404 and 504 as in FIGS. 4-5. In other implementations, the illustrated flowchart may be executed by a computing device.

At operation 302, the signal is asserted at the management processor from another processing component (e.g., BIOS) that tracks the firmware update. Upon initiation of the update, the signal is asserted at the management processor indicating the execution of the firmware update at a NVDIMM. Assertion of the signal means putting the signal in active state at the management processor. Placing the signal into the active state indicates to the management processor to proceed to increase the cooling fan speed.

At operations 304 the management processor may receive the first indication that the firmware update is being executed at the NVDIMM. The first indication may include the assertion of the signal to place into the active state. Placing into active state indicates to the management processor to proceed to operation 308 to set the cooling fan speed to the increase. If the management processor does not receive the first indication, the management processor may proceed to operation 306 and does not set the cooling fan speed to increase. Operation 304 is similar in functionality to operation 202 as in FIG. 2.

At operation 306 in response to the non-receipt of the first indication, the cooling fan speed is not increased. In one implementation, the cooling fan speed may remain in normal operating speed. Operation 306 may be similar in functionality to operation 204 as in FIG. 2.

Operation 308 the management processor communicates with the cooling fan to set the operating speed higher than the normal operating speed. Operation 308 may be similar in functionality to operation 206 as in FIG. 2.

At operation 310 in response to execution of the firmware update, the management processor sets the operating speed of the cooling fan to the maximum speed. The maximum speed may be defined according to a manufacturer's specs of the cooling fan. The maximum speed may be maintained until the firmware update is complete.

At operation 312 in response to the execution of the firmware update, the management processor suspends communications on a system bus between the management processor and the NVDIMM. Suspending communications on the system bus prevents data collisions during the firmware update.

At operation 314 the management processor may receive the second indication that the firmware update is complete. If the management processor receives the second indication, the method proceeds to set the cooling fan to a dynamic operating speed. If the management processor does not receive the second indication, the method may proceed to remain in the increased cooling fan speed. Operation 314 may be similar in functionality to operation 208 as in FIG. 2.

At operation 316 in response to the non-receipt of the second indication, the management processor may set the cooling fan speed to remain in the increased speed. Based on the non-receipt of the second indication, this indicates that the firmware update may still be on-going. Operation 316 may be similar in functionality to operation 210 as in FIG. 2.

At operation 318 in response to the firmware update being complete, the management processor may proceed to set the cooling fan to the dynamic operating speed. The dynamic operating speed is lower in speed than the updated operating speed at operation 306. In one implementation, the management processor may proceed to set the dynamic operating speed of the cooling fan back to the normal operating speed. Operation 318 may be similar in functionality to operation 212 as in FIG. 2.

At operation 320 in response to setting the dynamic operating speed, the management processor may proceed to reduce the operating speed back to the normal operating speed. In one implementation, the management processor signals to the cooling fan to resume normal operating speed based on a timeout period. In another implementation, the management processor receives a signal from another processor tracking the firmware update. So upon completion of the firmware update, the different processor signals to the management processor to set the cooling fan to resume the normal operating speed.

At operation 322, the management processor may resume communications on the bus based on the completion of the firmware update. During execution of the firmware update, the may be used to communicate the update. As such, the bus may be unavailable to the management processor during the update. Upon completion of the firmware update, the management processor may proceed to resume communications on the bus to the NVDIMM and other components. Examples of such communications may include monitoring the thermals (e.g., temperatures) and health of the NVDIMM. Thus, the management processor may actively respond to thermals and/or health of the NVDIMM by adjusting the cooling fan speed.

Figure 4:
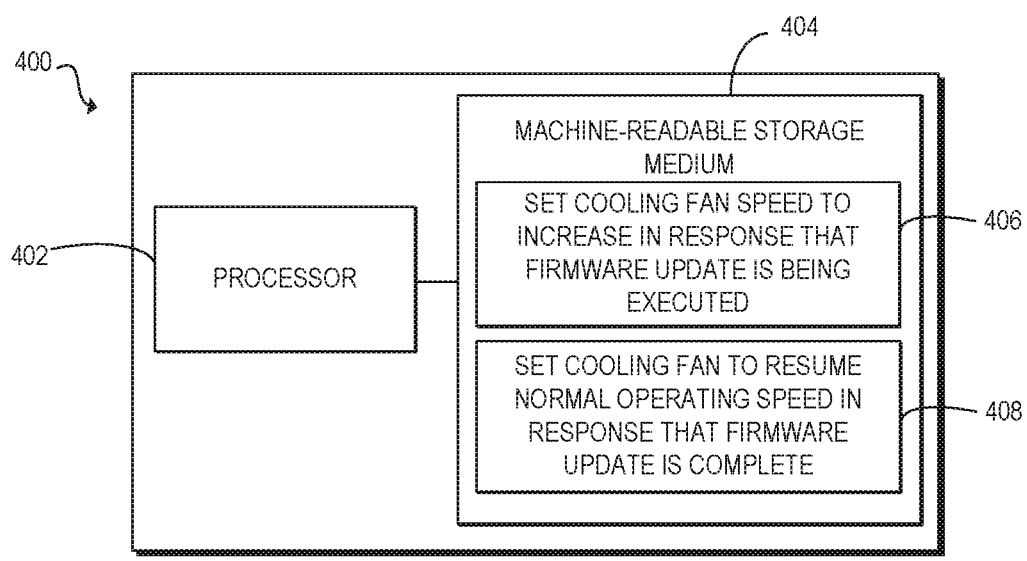
FIG. 4 is a block diagram of an example computing device with a processing resource to execute instructions in a machine-readable storage medium for adjusting a cooling fan speed in response to an execution of a firmware update and completion of the firmware update in accordance with the present disclosure.
Figure 5:
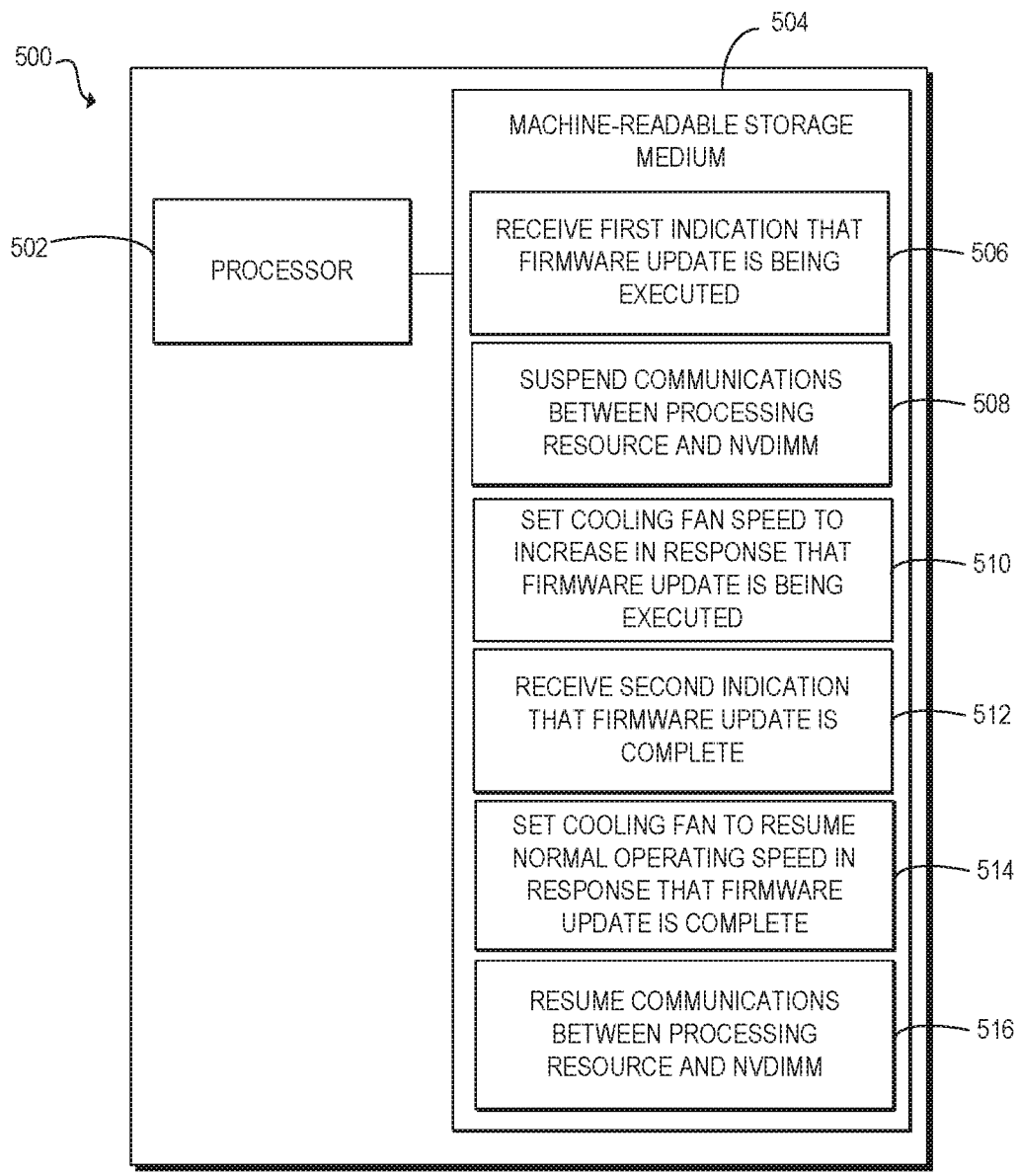
FIG. 5 is a block diagram of an example computing device with a processing resource to execute instructions in a machine-readable storage medium for adjusting a cooling fan speed based on a first indication that firmware update is being executed and a second indication that the firmware update is complete in accordance with the present disclosure.

Referring now to FIGS. 4 and 5, machine-readable instructions are illustrated in accordance with various examples of the present disclosure. While illustrated in a particular order, the machine-readable instructions are not intended to be so limited. Rather, it is expressly contemplated that various machine-readable instructions may occur in different orders and/or simultaneously with other machine-readable instructions.

FIG. 4 is a block diagram of computing device 400 with a processing resource 402 to execute instructions 406-408 within a machine-readable storage medium 404. Specifically, the computing device 400 with the processing resource 402 is to set a cooling fan to increase in response to a first indication corresponding to execution of a firmware update. In response to a second indication that the firmware update is complete, the processing resource 402 sets the cooling fan speed to resume to a normal operating speed. Although the computing device 400 includes processing resource 402 and machine-readable storage medium 404, it may also include other components that would be suitable to one skilled in the art. For example, the computing device 400 may include NVDIMM 120 as in FIG. 1. In other examples, the computing device 400 may include a controller, memory storage, or other suitable type of component. The computing device 400 is an electronic device with the processing resource 402 capable of executing instructions 406-406 and as such embodiments of the computing device 400 include a networking device, networking switch, switch, router, computing device, server, mobile device, client device, personal computer, desktop computer, laptop, tablet, or other type of electronic device capable of executing instructions 406-408. The instructions 406-408 may be implemented as methods, functions, operations, and other processes implemented as machine-readable instructions stored on the storage medium 404, which may be non-transitory, such as hardware storage devices e.g., random access memory (RAM), read only memory (ROM), erasable programmable ROM, electrically erasable ROM, hard drives, and flash memory).

The processing resource 402 may fetch, decode, and execute instructions 406-408 to adjust the cooling fan speed in response to the execution of the firmware update and completion of the firmware update. Specifically, the processing resource 402 executes instructions 406-406 to: set the cooling fan to increase in a higher speed than a normal operating speed in response to the first indication corresponding to execution of the firmware update; and set the cooling fan speed to resume to the normal operating speed in response to the second indication that the firmware update is complete at a memory component such that the adjustment of the cooling fan speed to increase and decrease is done in accordance with the firmware update.

The machine-readable storage medium 404 includes instructions 406-408 for the processing resource 402 to fetch, decode, and execute. In another implementation, the machine-readable storage medium 404 may be an electronic, magnetic, optical, memory, storage, flash-drive, or other physical device that contains or stores executable instructions. Thus, the machine-readable storage medium 404 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 404 may include software and/or firmware which can be utilized independently and/or in conjunction with the processing resource 402 to fetch, decode, and/or execute instructions of the machine-readable storage medium 404. The software and/or firmware may be stored on the machine-readable storage medium 404 and/or stored on another location of the computing device 400.

FIG. 5 is a block diagram of computing device 500 with a processing resource 502 to execute instructions 506-516 within a machine-readable storage medium 504. Specifically, the computing device 500 with the processing resource 502 is to receive when a firmware update is being executed and in response, suspend communications on a bus from the processing resource 502 while also increasing the fan speed from a normal operating speed. In response that the firmware update is complete, the processing resource 502 execute instructions to resume communications on the bus and decrease the cooling fan speed back to the normal operating speed. Although the computing device 500 includes processing resource 502 and machine-readable storage medium 504, it may also include other components that would be suitable to one skilled in the art. For example, the computing device 500 may include NVDIMM 120 as in FIG. 1. In other examples, the computing device 500 may include a controller, memory storage, or other suitable type of component. The computing device 500 is an electronic device with the processing resource 502 capable of executing instructions 506-516 and as such embodiments of the computing device 500 include a networking device, networking switch, switch, router, computing device, server, mobile device, client device, personal computer, desktop computer, laptop, tablet, or other type of electronic device capable of executing instructions 506-516. The instructions 506-518 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-516 to increase and decrease the cooling fan speed in accordance with the firmware update. Specifically, the processing resource 502 executes instructions 506-516 to: receive a first indication that the firmware update is being executed at the NVDIMM; in response to receipt of the first indication, suspend communications on the bus from the processing resource 502; in response to receipt of the first indication that the firmware update is being executed, set the cooling fan speed to increase from the normal operating speed; receive a second indication that the firmware update is complete; in response to receipt of the second indication, set the cooling fan speed to decrease from the increased speed to resume the normal operating speed; in response that the firmware update is complete, resume communications by the processing resource 502 and/or NVDIMM to monitor health, temperature, etc.

The machine-readable storage medium 504 includes instructions 506-516 for the processing resource 502 to fetch, decode, and execute. In another implementation, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include software and/or firmware which can be utilized independently and/or in conjunction with the processing resource 502 to fetch, decode, and/or execute instructions of the machine-readable storage medium 504. The software and/or firmware may be stored on the machine-readable storage medium 504 and/or stored on another location of the computing device 500.

Although certain implementations have been illustrated and described herein, it will be appreciated that a wide variety of alternate and/or equivalent implementations calculated to achieve the same purposes may be substituted for the implementations shown and described without departing from the scope of this disclosure. Those with skill in the art will readily appreciate that implementations may be implemented in a variety of ways. This application is intended to cover adaptions or variations of the implementations discussed herein. Therefore, it is manifestly intended that implementations be limited only by the claims and equivalents thereof.

We claim:

1. A method executable by a management processor coupled to a memory component via a bus, the method comprising:
   adjusting a normal dynamic operating speed of a cooling fan in response to a thermal measurement communicated from the memory component to the management processor via the bus;
   in response to a first indication that a firmware update is being executed at the memory component, increasing a cooling fan speed of the cooling fan from the normal dynamic operating speed to an update operating speed that is higher than the normal dynamic operating speed, wherein the cooling fan speed is increased from the normal dynamic operating speed to the update operating speed regardless of a temperature of the memory component during the firmware update;
   during the firmware update, suspending thermal measurement communication on the bus between the management processor and the memory component; and
   in response to a second indication that the firmware update has completed, reducing the increased cooling fan speed to the normal dynamic operating speed, and resuming thermal measurement communication on the bus between the management processor and the memory component.

2. The method of claim 1, wherein the first indication that the firmware update is being executed comprises:
   assertion of a signal at the management processor responsive to a determination that the firmware update is being executed at the memory component.

3. The method of claim 1, wherein the suspending of the thermal measurement communication on the bus is in response to the first indication.

4. The method of claim 1, wherein the increasing of the cooling fan speed to the update operating speed that is higher than the normal dynamic operating speed comprises:
   setting the cooling fan speed to operate at a maximum speed throughout the firmware update.

5. The method of claim 2, wherein the memory component is a non-volatile dual in-line memory module.

6. A system comprising:
   a cooling fan; and
   a management processor, coupled to the cooling fan, to:
      receive a first thermal measurement from a memory component via a communication bus;
      adjust a normal dynamic operating speed of the cooling fan in response to the first thermal measurement received via the communication bus;
      receive a first indication that a firmware update to a memory component has been initiated; and
      receive a second indication that the firmware update has been completed;
   wherein the management processor is to, in response to the first indication that the firmware update has been initiated, increase a cooling fan speed of the cooling fan from the normal dynamic operating speed to an update cooling fan speed, and suspend thermal measurement communication on the communication bus between the management processor and the memory component, wherein the cooling fan speed is increased from the normal dynamic operating speed to the update cooling fan speed regardless of a temperature of the memory component during the firmware update, and wherein the management processor is to, in response to the second indication that the firmware update has completed, reduce the increased cooling fan speed to the normal dynamic operating speed, and resume thermal measurement communication on the communication bus between the management processor and the memory component.

7. The system of claim 6, further comprising:
a non-volatile dual in-line memory module (NVDIMM), coupled to the management processor, to;
apply the firmware update; and
communicate the first and second indications to the management processor.

8. The system of claim 7, wherein the memory component is part of the NVDIMM, and wherein the management processor is to:
suspend thermal measurement communication on the communication bus between the management processor and the NVDIMM based on the first indication that the firmware update has been initiated; and
resume thermal measurement communication on the communication bus between the management processor and the NVDIMM based on the second indication that the firmware update has been completed.

9. A non-transitory machine-readable storage medium comprising instructions that when executed by a processing resource cause a computing device to:
adjust a normal dynamic operating speed of a cooling fan in response to a thermal measurement communicated from a memory component to a management processor via a communication bus;
in response to a first indication that a firmware update in the memory component has been initiated, set the cooling fan to increase speed from the normal dynamic operating speed to an update operating speed, wherein the speed of the cooling fan is increased from the normal dynamic operating speed to the update operating speed regardless of a temperature of the memory component during the firmware update;
suspend a thermal measurement communication on the communication bus between the management processor and the memory component during the firmware update; and
in response to a second indication that the firmware update has completed, set the cooling fan to decrease to the normal dynamic operating speed, and resume thermal measurement communication on the communication bus between the management processor and the memory component.

10. The non-transitory machine-readable storage medium of claim 9, wherein the instructions cause the computing device to:
suspend thermal measurement communications between the management processor and a non-volatile dual in-line memory module (NVDIMM) during execution of the firmware update in the NVDIMM, wherein the memory component is part of the NVDIMM.

11. The non-transitory machine-readable storage medium of claim 10, wherein the instructions cause the computing device to:
resume thermal measurement communication between the management processor and the NVDIMM in response to the second indication.

12. The non-transitory machine-readable storage medium of claim 9, further comprising instructions that when executed by the processing resource cause the computing device to:
receive the first indication that the firmware update has been initiated at a non-volatile dual in-line memory module (NVDIMM); and
receive the second indication that the firmware update has completed at the NVDIMM.

* * * * *